United States Patent
Lee et al.

(10) Patent No.: US 10,512,309 B2
(45) Date of Patent: Dec. 24, 2019

(54) SEAT BELT CONNECTOR TONGUE ASSEMBLY HAVING LOCKING MECHANISM

(71) Applicant: Ford Global Technologies, LLC, Dearborn, MI (US)

(72) Inventors: Michael Lee, Royal Oak, MI (US); Joseph Cicchelli, Warren, MI (US); Sone Sadakhom, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 15/868,140

(22) Filed: Jan. 11, 2018

(65) Prior Publication Data
US 2019/0208869 A1    Jul. 11, 2019

(51) Int. Cl.
| | | |
|---|---|---|
| *A44B 11/25* | (2006.01) | |
| *B60R 22/18* | (2006.01) | |
| *A44B 11/10* | (2006.01) | |
| *A44B 11/14* | (2006.01) | |
| *A44B 11/16* | (2006.01) | |
| *B60R 22/02* | (2006.01) | |
| *B60R 22/30* | (2006.01) | |

(52) U.S. Cl.
CPC .......... *A44B 11/2557* (2013.01); *A44B 11/10* (2013.01); *A44B 11/14* (2013.01); *A44B 11/16* (2013.01); *A44B 11/2561* (2013.01); *B60R 22/023* (2013.01); *B60R 22/18* (2013.01); *B60R 22/30* (2013.01); *B60R 2022/021* (2013.01); *B60R 2022/1812* (2013.01)

(58) Field of Classification Search
CPC ..... A44B 11/2557; A44B 11/16; A44B 11/14; A44B 11/10; A44B 11/2561; B60R 22/023; B60R 22/30; B60R 2022/021
See application file for complete search history.

(56) References Cited

U.S. PATENT DOCUMENTS

| | | | | |
|---|---|---|---|---|
| 3,981,535 A | * | 9/1976 | Henderson | A44B 11/2557 297/474 |
| 4,167,054 A | * | 9/1979 | Yamada | A44B 11/10 24/171 |
| 4,551,889 A | * | 11/1985 | Narayan | A44B 11/10 24/171 |
| 4,876,770 A | * | 10/1989 | Bougher | A44B 11/2557 24/170 |
| 4,979,764 A | | 12/1990 | Drinane et al. | |
| 5,100,176 A | | 3/1992 | Ball et al. | |
| 5,870,816 A | | 2/1999 | McFalls et al. | |
| 6,666,519 B2 | | 12/2003 | Palliser et al. | |
| 7,325,280 B2 | | 2/2008 | Ichida | |
| 8,474,106 B2 | | 7/2013 | Richter et al. | |
| 2012/0068520 A1 | * | 3/2012 | McFalls | A44B 11/2553 297/468 |

(Continued)

*Primary Examiner* — Darlene P Condra
(74) *Attorney, Agent, or Firm* — Vichit Chea; Price Heneveld LLP (57) ABSTRACT

A seat belt assembly including a seat belt webbing, a buckle, and a connector tongue assembly. The tongue assembly includes a body, a slot in the body for receiving a seat belt webbing, a locking mechanism located proximate the slot, and a spring biasing the locking mechanism towards the slot to frictionally engage the webbing to prevent freefall of the assembly.

18 Claims, 6 Drawing Sheets

(56) References Cited

U.S. PATENT DOCUMENTS

| | | | | |
|---|---|---|---|---|
| 2012/0286501 | A1* | 11/2012 | Goudeau | A44B 11/2561 280/801.1 |
| 2013/0341994 | A1* | 12/2013 | Boughner | A44B 11/2561 297/468 |
| 2015/0173461 | A1* | 6/2015 | Okano | A44B 11/2561 24/593.1 |
| 2017/0055643 | A1* | 3/2017 | Knoedl | A44B 11/2553 |
| 2017/0297528 | A1* | 10/2017 | Hermann | B60R 22/1855 |
| 2017/0355349 | A1* | 12/2017 | Betz | B60R 22/1855 |

* cited by examiner

SEAT BELT CONNECTOR TONGUE ASSEMBLY HAVING LOCKING MECHANISM

FIELD OF THE INVENTION

The present invention generally relates to vehicle seat belts, and more particularly relates to seat belt connector tongue assemblies that slide on the seat belt webbing.

BACKGROUND OF THE INVENTION

Automotive vehicles are typically equipped with seat belts for restraining passengers seated in vehicle seats. Conventional seat belts typically include a belt forming a lap belt and a shoulder belt that is connected onto a seat belt tongue which, in turn, releasibly connects to a buckle that is fixed to a vehicle structure, such as a seat or a floor. The seat belt is made of a seat belt webbing and the seat belt tongue may slide on the webbing to allow for repositioning between use and stowed positions and to accommodate different size passengers. When the seat belt is disconnected from the buckle, the tongue typically rests on a fixed stop on the webbing to maintain the position of the tongue such that it does not slide downward on the webbing due to gravity and normal vehicle driving. It would be desirable to provide for an enhanced tongue assembly that positions the tongue on the seat belt webbing.

SUMMARY OF THE INVENTION

According to one aspect of the present invention, a seat belt connector tongue assembly is provided. The seat belt connector tongue assembly includes a body, a slot in the body for receiving a seat belt webbing, a locking mechanism located proximate the slot, and a spring biasing the locking mechanism towards the slot to frictionally engage the webbing to prevent freefall of the assembly.

Embodiments of the first aspect of the invention can include any one or a combination of the following features:
the locking mechanism comprises a rotatable cam, wherein the spring biases the cam towards the slot to engage the webbing with a force sufficient to prevent freefall of the assembly;
the cam comprises a locking cam that rotates to a locked position with the webbing when the webbing is in tension due to a crash event;
the locking mechanism comprises a linear displaceable member;
the spring comprises a torsion spring;
the spring comprises a leaf spring;
the locking mechanism comprises a lock bar, wherein the spring biases the lock bar towards the slot to engage the webbing with sufficient force to prevent freefall of the assembly;
the seat belt webbing comprises a shoulder belt and a lap belt;
the spring biases a locking mechanism onto the webbing to apply a force less than 30 newtons; and
the body comprises a latch mechanism configured to latch onto a buckle on a seat belt assembly on a vehicle.

According to another aspect of the present invention, a seat belt assembly is provided. The seat belt assembly includes a seat belt webbing and a buckle. The connector tongue assembly includes a body, a slot in the body for receiving a seat belt webbing, a locking mechanism located proximate the slot, and a spring biasing the locking mechanism towards the slot to frictionally engage the webbing to prevent freefall of the tongue assembly.

Embodiments of the second aspect of the invention can include any one or a combination of the following features:
the locking mechanism comprises a rotatable cam, wherein the spring biases the cam toward the slot to engage the webbing with a force sufficient to prevent freefall of the assembly;
the cam comprises a locking cam that rotates to a locked position with the webbing when the webbing is in tension due to a crash event;
the locking mechanism comprises a linear displaceable member;
the spring comprises a torsion spring;
the spring comprises a leaf spring;
the locking mechanism comprises a lock bar, wherein the spring biases the lock bar toward the slot to engage the webbing with sufficient force to prevent freefall of the assembly;
the seat belt webbing comprises a shoulder belt and a lap belt;
the spring biases a locking mechanism onto the webbing to apply a force less than 30 newtons; and
the body comprises a latch mechanism configured to latch onto the buckle on a vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
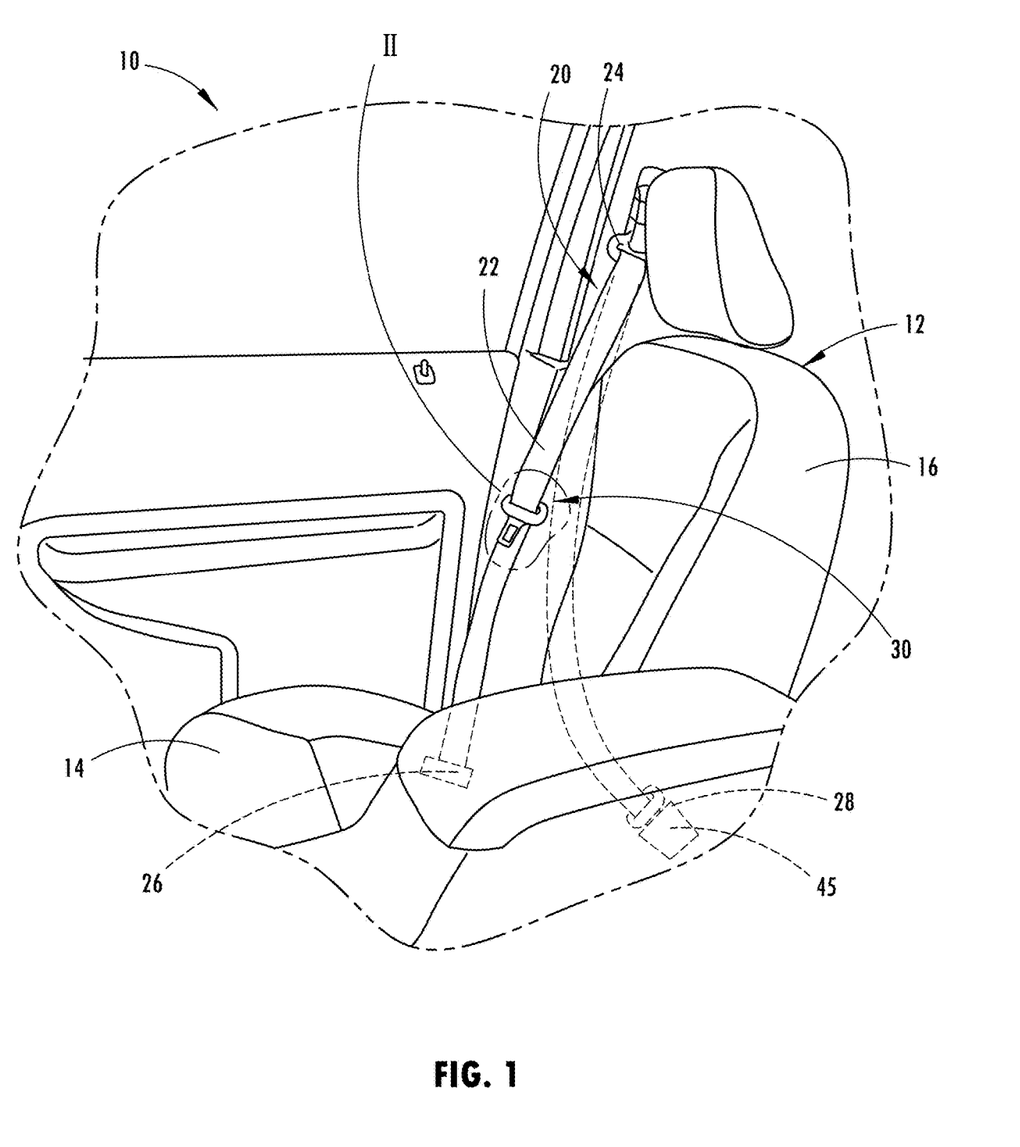
FIG. 1 is a perspective view of a passenger cabin of an automotive vehicle having a seat belt system for restraining a passenger and configured with a seat belt tongue assembly, according to one embodiment.
Figures 2, 3:
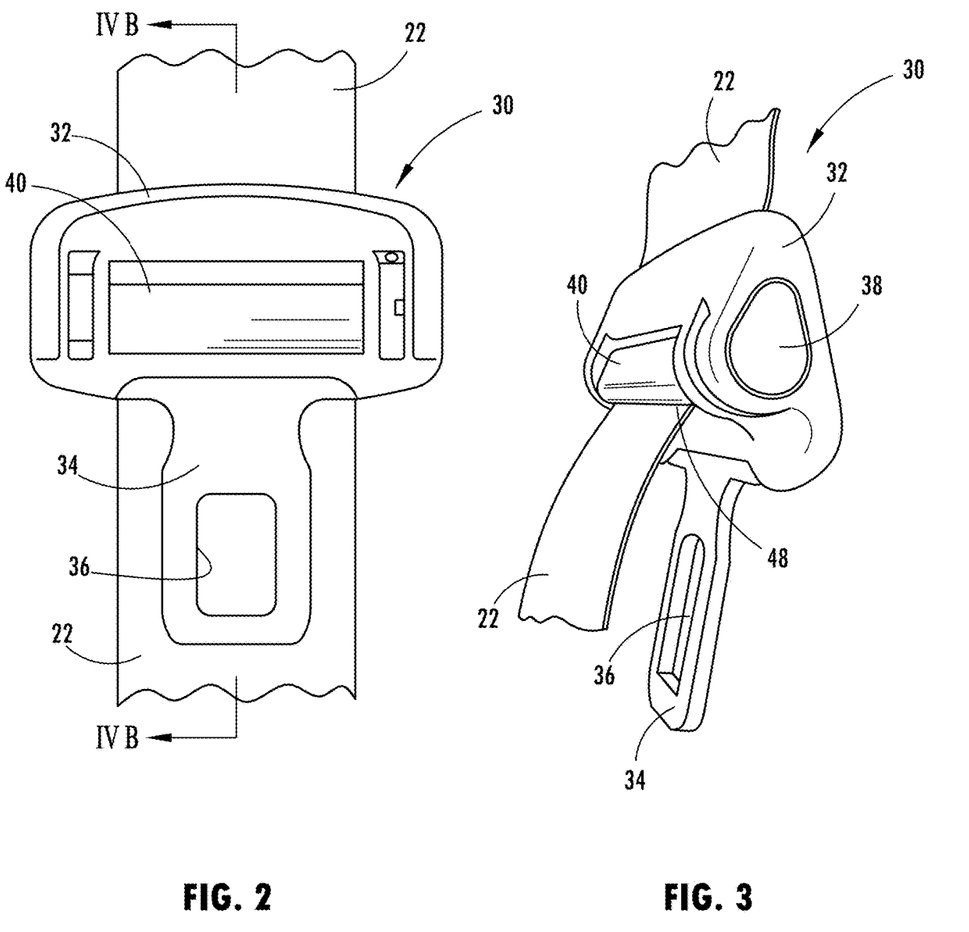
FIG. 2 is an enlarged view of section II of FIG. 1 further illustrating the seat belt tongue assembly, according to one embodiment.
FIG. 3 is a side perspective view of the seat belt tongue assembly shown in FIG. 2.
Figure 4A:
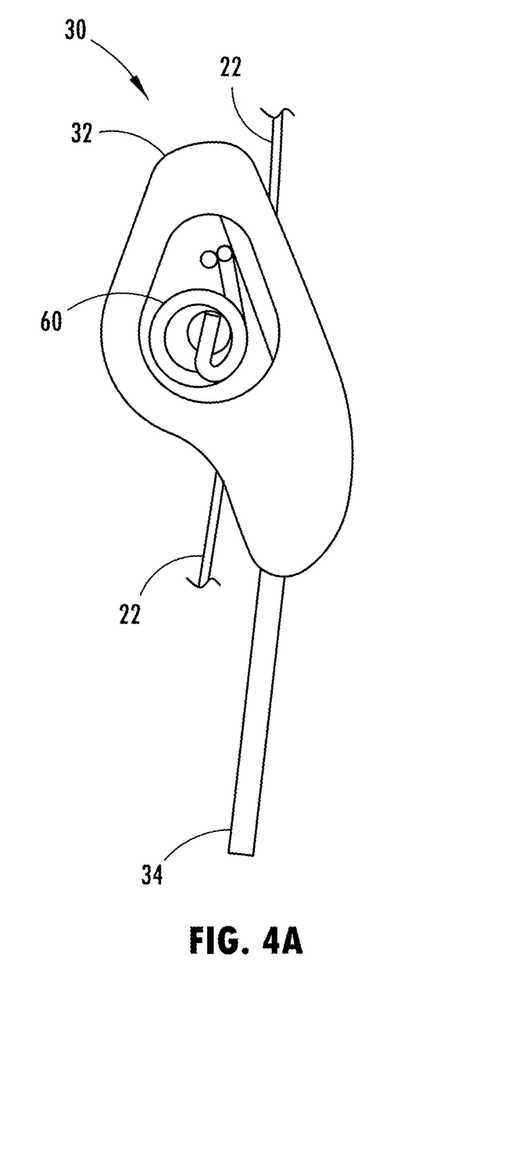
FIG. 4A is a side view of the seat belt tongue assembly shown in FIG. 3 in an at-rest configuration and with an end cap removed.
Figure 4B:
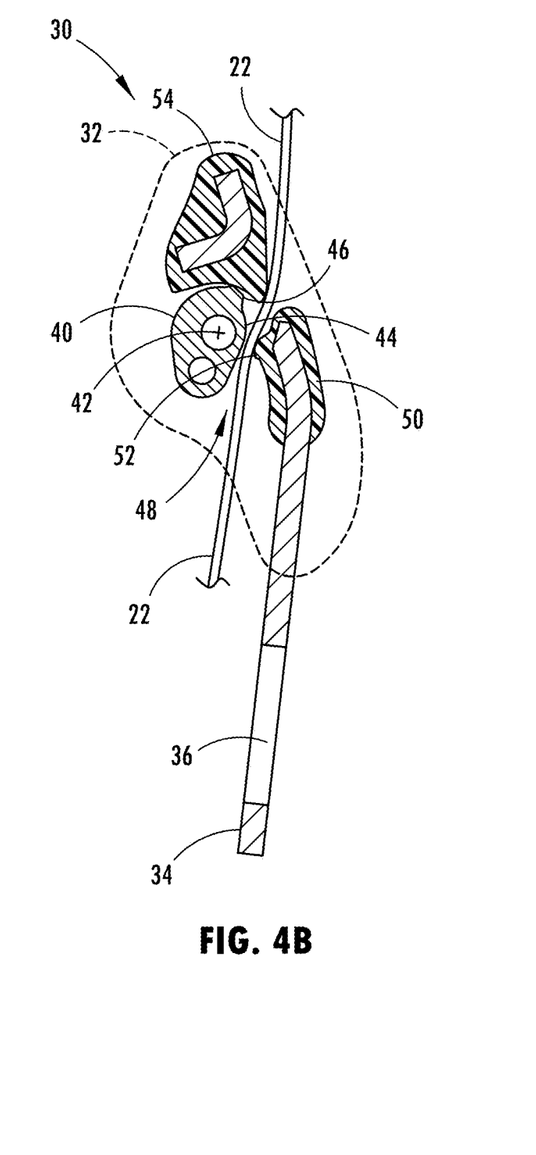
FIG. 4B is a cross-sectional view of the seat belt tongue assembly taken through line IVB-IVB of FIG. 2.

Referring now to FIG. 1, a portion of the passenger cabin or compartment of a vehicle 10 is generally illustrated having a seat belt system 20 assembled onto a seat assembly 12 and including a seat belt connector tongue assembly 30 engaged on a seat belt webbing 22, according to one embodiment. The vehicle 10 may include a wheeled motor vehicle, such as a car, truck, van or any other type of vehicle that includes a seat belt system. The seat assembly 12 is generally illustrated including a lower seat 14 pivotally connected to an upper seat back 16 and configured to receive and retain a seated passenger. It should be appreciated that the vehicle 10 may include a plurality of seat assemblies 12 each including a seat belt system 20 having a seat belt tongue assembly 30 engaged on the seat belt webbing 22 as shown and described herein.

The seat belt system 20 is shown as a three-point seat belt configuration having the seat belt webbing 22 connected at a first connection point 24 generally near the top of the seat back 16 or another supporting portion within the vehicle such as the B-pillar, a second connection point 26 connected to the floor or the seat 14 of the vehicle generally in the region of the lap of a passenger (not shown) seated on the seat 14, and a third connection point 28 shown at a seat belt buckle 45 which releasibly connects with the connector tongue assembly 30. The connector tongue assembly 30 is configured to be matingly and releasibly coupled to the seat belt buckle 45 for fastening the tongue assembly 30 onto the buckle 45. The seat belt system 20 includes the seat belt comprising the seat belt webbing 22. The seat belt webbing 22 may be a fabric strap and may be flat according to one embodiment or may be generally in the shape of a flattened tube defining an interior passageway which may form a seat belt airbag according to another embodiment.

In the embodiment shown, the seat belt webbing 22 serves to form a shoulder belt that is generally positioned to extend from the connector tongue assembly 30 over the shoulder and chest of a passenger and a lap belt which is positioned to extend over the lap of the passenger when seated in the seat assembly 12. The lap belt and shoulder belt are therefore integrally formed of the same webbing 22 as shown. It should be appreciated that in the use position, where the tongue assembly 30 is connected to the buckle 45, the tongue assembly 30 divides the shoulder belt and the lap belt. The seat belt webbing 22 may include a conventional webbing material that forms a seat belt. The seat belt webbing 22 may extend within one or more seat belt retractors such as retractors located at or near one or both of the first connection point 24 and second connection point 26.

The seat belt webbing 22 connects to the connector tongue assembly 30 such that the tongue assembly 30 slides on the seat belt webbing 22. The connection is made by way of a slot 48 extending through the connector tongue assembly 30 which enables the seat belt webbing 22 to pass through the slot 48 in the seat belt connector tongue assembly 30. The seat belt connector tongue assembly 30 is configured with a self-parking feature that holds the tongue assembly 30 fixed in position on the seat belt webbing 22 sufficient to prevent gravity and normal vehicle use from causing the tongue assembly 30 to slide and thereby change position on the seat belt webbing 22. As such, when the seat belt system 20 is in a non-use stowed position, the connector tongue assembly 30 will maintain its position suspended on the seat belt webbing 22. As such, the seat belt connector tongue assembly 30 does not drop downward towards the ground or slide on the seat belt webbing 22 during normal vehicle usage, and is maintained in the desired elevated position on the seat belt webbing 22. When a seated passenger uses the seat belt system 20, the seat belt connector tongue assembly 30 slides along the seat belt webbing 22 due to force applied by the user on the connector tongue assembly 30 to enable the tongue assembly 30 to be positioned to be connected (i.e., latched) onto the buckle 45.

Referring to FIGS. 2-4B, the seat belt connector tongue assembly 30 is further illustrated having a metal tongue 34 that forms a latch plate and has latch receiving opening 36 to enable engagement with a latch on the buckle 45. The metal tongue 34 is thus sized and positioned to be received within the buckle 45 and latched thereto. A plastic coated portion 50 is provided on the upper end of the metal tongue 34. The connector tongue assembly 30 further includes an upper housing 32 which connects to and holds the metal tongue 34 and an upper support member 54. The seat belt slot 48 extends through the upper housing 32 to enable the seat belt webbing 22 to extend therethrough.

The seat belt connector tongue assembly 30 includes a locking mechanism located proximate to the slot 48 and hence the seat belt webbing 22 extending therethrough. In the first embodiment shown in FIGS. 2-5B, the locking mechanism is a spring biased rotating cam 40 that rotates about a pivot shaft 42. The seat belt webbing 22 extends through the seat belt slot 48 between the cam 40 and the plastic coated portion 50 of the metal tongue 34. The plastic coated portion 50 has an outward protruding surface 52. The cam 40 has an outward protruding surface 44. The outward protruding surfaces 44 and 52 face each other and provide a narrow passage forming part of slot 48 for the seat belt webbing 22 to pass therethrough.

The seat belt connector tongue assembly 30 includes a spring 60 for biasing the locking mechanism towards the slot 48 to frictionally engage the seat belt webbing 22 to prevent freefall or unintended sliding of the connector tongue assembly 30. In the embodiment shown in FIG. 4A, the spring 60, such as a coil or torsion spring, shown within housing 32 with a cap 38 removed biases the locking mechanism shown as the cam 40 towards surface 52 such that surface 44 contacts the seat belt webbing 22 with sufficient force to provide sufficient frictional engagement with the seat belt webbing 22 to prevent the tongue assembly 30 from freefall or sliding on the seat belt webbing 22 due to gravity and normal vehicle driving. The spring bias force may be greater than 0 newtons and less than 30 newtons, according to one embodiment. The bias force is sufficiently small to enable the connector tongue assembly 30 to slide on the seat belt webbing 22 when a user pulls with force on the tongue assembly 30 to connect and disconnect it with the buckle 45. As such, the cam 40 is biased into an engaged position to prevent freefall or sliding. The spring 60 may include a coil or other spring bias force mechanism to apply force to bias the cam 40 towards and in engagement with the seat belt webbing 22.

Figure 5A:
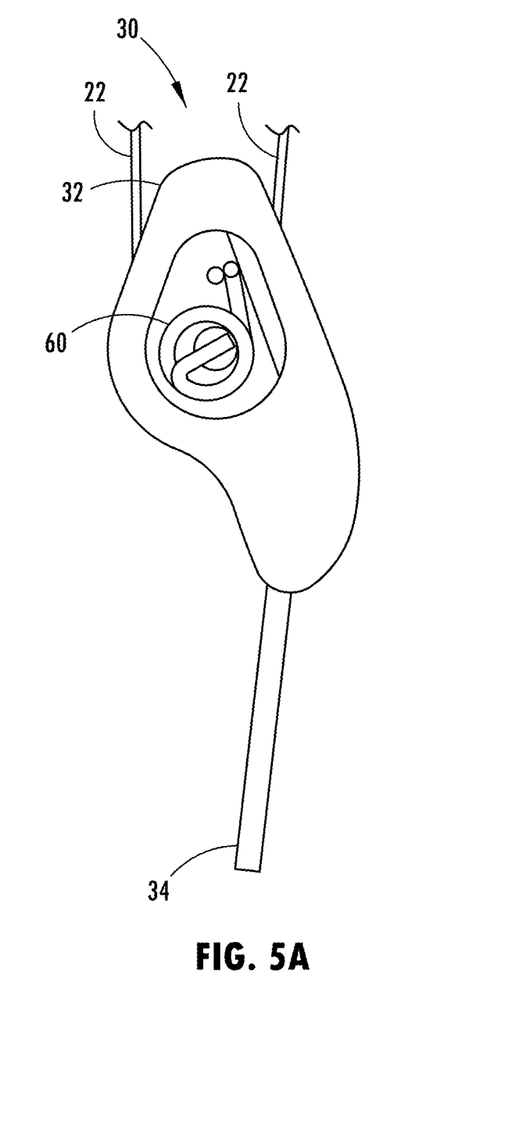
FIG. 5A is a side view of the seat belt tongue assembly of FIG. 2 in a crash event configuration.
Figure 5B:
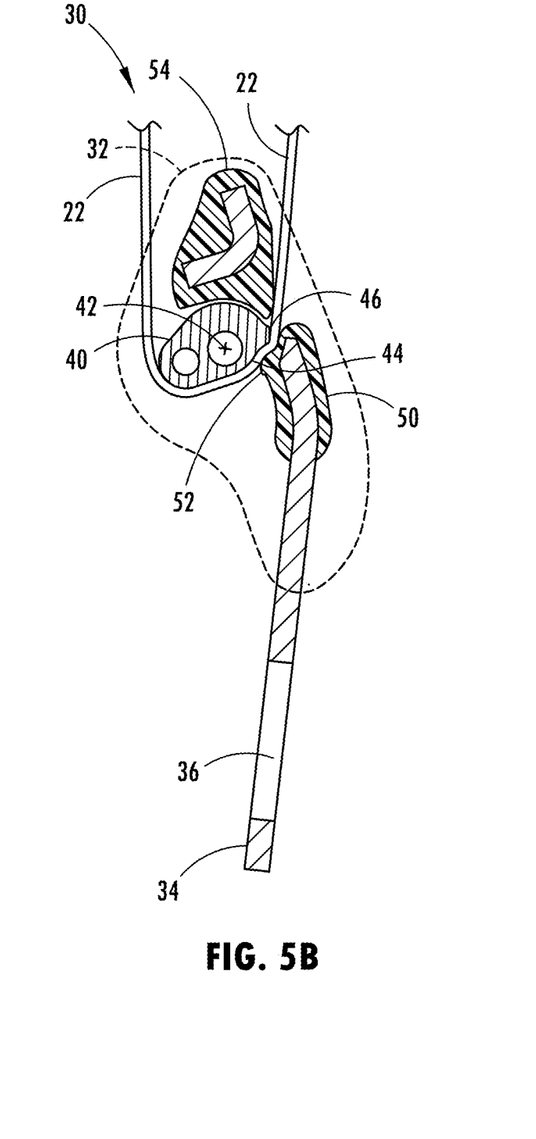
FIG. 5B is a cross-sectional view of the seat belt tongue assembly shown in FIG. 4B in a crash event configuration.

When the seat belt system 20 is in use such that the connector tongue assembly 30 is connected to the buckle 45, the seat belt webbing 22 when pulled under tension rotates the cam 40 as shown in FIG. 5B. As such, during a crash event when force is applied to the seat belt webbing 22, the cam 40 operates as a crash lock tongue (CLT) that locks the seat belt webbing 22 in place during a crash event. When this occurs, a locking protrusion 46 on the end of the cam 40 rotates into position to apply force onto the seat belt webbing 22 on one side to pinch the seat belt webbing 22 onto the portion 50 of the tongue 34 on the opposite side of seat belt webbing 22 to prevent movement of the tongue assembly 30 on the seat belt webbing 22. It should be appreciated that the connector tongue assembly 30 according to this embodiment may be employed with or without the crash lock tongue design.

Figure 6A:
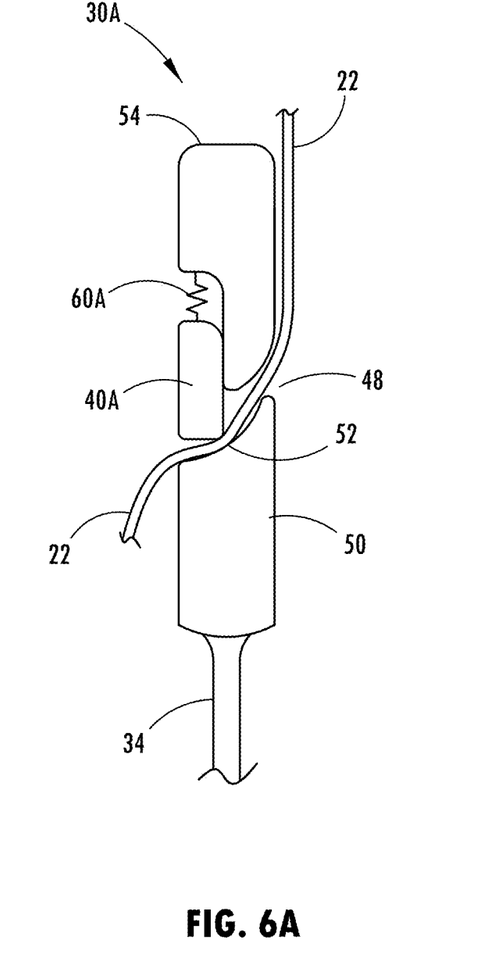
FIG. 6A is a cross-sectional view of a seat belt tongue assembly in an at rest configuration, according to another embodiment.
Figure 6B:
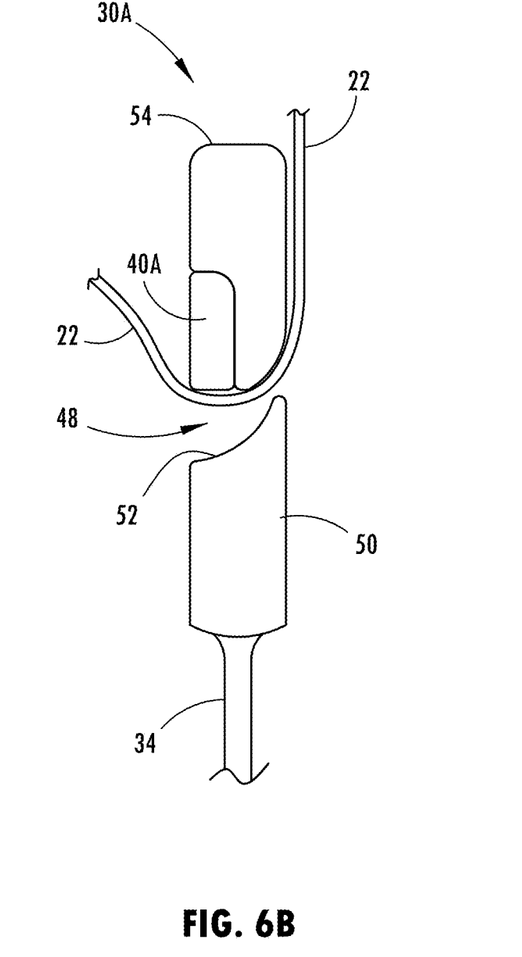
FIG. 6B is a cross-sectional view of the seat belt tongue assembly shown in FIG. 6A in a crash event configuration and when worn during normal usage.
Figure 6C:
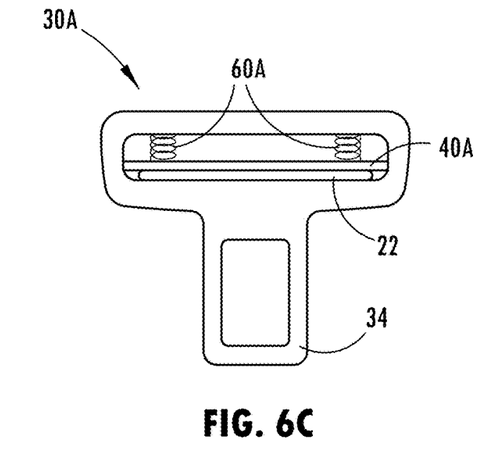
FIG. 6C is a schematic view of a seat belt tongue assembly employing a pair of coil springs, according to one embodiment.
Figure 6D:
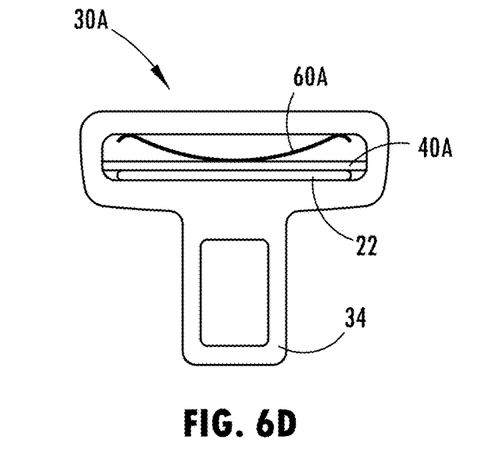
FIG. 6D is a schematic view of a seat belt tongue assembly employing a leaf spring, according to another embodiment.

Referring to FIGS. 6A-6D, a seat belt connector tongue assembly 30A is shown having a linear displaceable locking mechanism 40A for engaging the seat belt webbing 22 to prevent freefall or sliding of the tongue assembly 30. In this embodiment, the linear locking mechanism 40A is biased via a spring 60A with sufficient force to frictionally contact the seat belt webbing 22 and prevent freefall or sliding. When the seat belt is in use, the linear locking mechanism 40A is forced under tension of the seat belt webbing 22 to an upward stowed position such that the seat belt assembly 20 is able to slide through the slot 48 as seen in FIG. 6B. The spring 60A may include a pair of coil springs 60A biasing a linear extendable member 40A as seen in FIG. 6A. According to another embodiment, the spring 60 may include a leaf spring for biasing the linear locking member 40A as seen in FIG. 6D.

Figure 7:
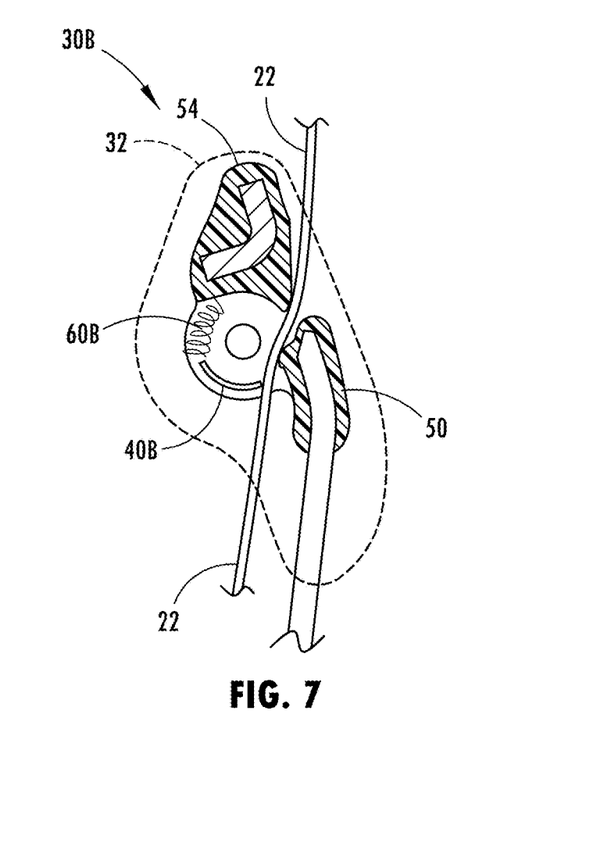
FIG. 7 is a cross-sectional view of a seat belt tongue assembly employing a self-park lock bar, according to a further embodiment.

Referring to FIG. 7, a seat belt connector tongue assembly 30B is shown employing a rotating lock mechanism, according to a further embodiment. In this embodiment, the locking mechanism 40A is a rotating locking mechanism 40B that is biased via a spring 60B into a position that engages the seat belt webbing 22 as sufficient force to prevent freefall or sliding of the tongue assembly 30. The rotating locking mechanism 40B may include a lock bar that rotates upon receiving a bias force from the spring 60B into position engaged with the seat belt webbing 22 to press the webbing 22 between portion 50 and the lock bar 40B. It should be appreciated that other shapes and sizes of rotating and linear locking mechanisms and springs may be employed.

Accordingly, the seat belt connector tongue assembly 30 advantageously allows sliding of the connector tongue assembly 30 on a seat belt webbing 22 and prevents freefall or sliding of the assembly 30 due to gravity and normal vehicle driving conditions. The tongue assembly 30 therefore allows for the seat belt tongue assembly 30 to be maintained in a desired position on the seat belt webbing 22 when not connected to the buckle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat belt connector tongue assembly comprising:
   a body;
   a slot in the body for receiving a seat belt webbing;
   a locking mechanism located proximate the slot; and
   a spring biasing the locking mechanism towards the slot to frictionally engage the webbing to prevent freefall of the assembly, wherein the spring biases the locking mechanism onto the webbing to apply a force less than 30 newtons.

2. The seat belt connector tongue assembly of claim 1, wherein the locking mechanism comprises a rotatable cam, wherein the spring biases the cam towards the slot to engage the webbing with a force sufficient to prevent freefall of the assembly.

3. The seat belt connector tongue assembly of claim 2, wherein the cam comprises a locking cam that rotates to a locked position with the webbing when the webbing is in tension due to a crash event.

4. The seat belt connector tongue assembly of claim 1, wherein the locking mechanism comprises a linear displaceable member.

5. The seat belt connector tongue assembly of claim 4, wherein the spring comprises a torsion spring.

6. The seat belt connector tongue assembly of claim 4, wherein the spring comprises a leaf spring.

7. The seat belt connector tongue assembly of claim 1, wherein the locking mechanism comprises a lock bar, wherein the spring biases the lock bar towards the slot to engage the webbing with sufficient force to prevent freefall of the assembly.

8. The seat belt connector tongue assembly of claim 1, wherein the seat belt webbing comprises a shoulder belt and a lap belt.

9. The seat belt tongue assembly of claim 1, wherein the body comprises a latch mechanism configured to latch onto a buckle on a seat belt assembly on a vehicle.

10. A seat belt assembly comprising:
    a seat belt webbing; and
    a buckle;
    a connector tongue assembly comprising:
      a body;
      a slot in the body for receiving a seat belt webbing;
      a locking mechanism located proximate the slot; and
      a spring biasing the locking mechanism towards the slot to frictionally engage the webbing to prevent freefall of the tongue assembly, wherein the spring biases the locking mechanism onto the webbing to apply a force less than 30 newtons.

11. The seat belt assembly of claim 10, wherein the locking mechanism comprises a rotatable cam, wherein the spring biases the cam toward the slot to engage the webbing with a force sufficient to prevent freefall of the assembly.

12. The seat belt assembly of claim 11, wherein the cam comprises a locking cam that rotates to a locked position with the webbing when the webbing is in tension due to a crash event.

13. The seat belt assembly of claim 10, wherein the locking mechanism comprises a linear displaceable member.

14. The seat belt assembly of claim 13, wherein the spring comprises a torsion spring.

15. The seat belt assembly of claim 13, wherein the spring comprises a leaf spring.

16. The seat belt assembly of claim 10, wherein the locking mechanism comprises a lock bar, wherein the spring biases the lock bar toward the slot to engage the webbing with sufficient force to prevent freefall of the assembly.

17. The seat belt assembly of claim 10, wherein the seat belt webbing comprises a shoulder belt and a lap belt.

18. The seat belt assembly of claim 10, wherein the body comprises a latch mechanism configured to latch onto the buckle on a vehicle.

* * * * *